United States Patent [19]

Jones, Jr. et al.

[11] 3,881,068

[45] Apr. 29, 1975

[54] BRIDGE LIFTER FOR TELEPHONE LINE

[75] Inventors: Charles Elmer Jones, Jr., Fairfield; William Frederick MacPherson, Warren Twp., Somerset County, both of N.J.

[73] Assignee: Bell Telephone Laboratories, Incorporated, Berkeley Heights, N.J.

[22] Filed: May 16, 1974

[21] Appl. No.: 470,623

[52] U.S. Cl. ............................... 179/35; 179/18 FA

[51] Int. Cl. ............................... H04m 13/00

[58] Field of Search ............ 179/35, 17, 17 B, 18 F, 179/18 FA, 27 E, 28, 30-36

[56] References Cited

UNITED STATES PATENTS

| | | | |
|---|---|---|---|
| 3,076,871 | 2/1963 | Bauman | 179/2.5 |
| 3,188,398 | 6/1965 | Busala | 179/35 |
| 3,284,575 | 11/1966 | Howard | 179/31 |
| 3,703,610 | 11/1972 | Ebbe et al. | 179/35 |
| 3,808,377 | 4/1974 | Young | 179/18 FA |

*Primary Examiner*—Kathleen H. Claffy
*Assistant Examiner*—Gerald L. Brigance
*Attorney, Agent, or Firm*—A. D. Hooper

[57] ABSTRACT

An electronic bridge lifter for multiparty lines and the like which can be mounted in a protector on the protector frame includes an impedance serially inserted in each side of the loop for isolating the loop from the line, a loop current measuring circuit, and a switch responsive to the loop current measuring circuit when the loop current exceeds a preselected threshold for shunting the impedance and connecting the loop to the common line through a low-loss path.

11 Claims, 4 Drawing Figures

BRIDGE LIFTER FOR TELEPHONE LINE

BACKGROUND OF THE INVENTION

1. Field of the Invention

This invention relates to bridge lifters for isolating the idle ones of a plurality of loops which are connected to a common transmission medium.

2. Description of the Prior Art

Two or more subscriber loops or wire paths are often bridged or connected across a common transmission medium. For example, such bridging is utilized where multiparty lines are provided, where secretarial or answering services are used, or where extensions in remote locations are provided. Apparatus commonly known as a "bridge lifter" is then required to isolate the idle ones of these multiple loops to prevent loading the active loops and causing unacceptable transmission loss therein. When a previously idle loop becomes active the bridge lifter must not add any appreciable loss to the loop but must provide a low-loss connection to the common transmission medium.

Saturable core inductors such as described in U.S. Pat. No. 2,924,667 issued Feb. 9, 1960, to L. Hochgraf are widely used as bridge lifters. While the cost of these inductors is relatively small and they perform the bridge lifting function quite well over an extended life, their bulk requires that they be mounted on remote equipment frames within the central office and subsequently connected to the main distributing frame and protector frame by tie pairs or jumpers. This results in an installed cost as much as ten times greater than the cost of the inductor.

Various other types of bridge lifters are also disclosed in the prior art including diode networks, varistors, and inductive networks. All of these bridge lifters suffer various disadvantages.

Accordingly it is an object of this invention to improve bridge lifters for isolating the idle loops in multiparty lines and the like.

SUMMARY OF THE INVENTION

The foregoing objects and others are achieved in accordance with the invention by an electronic bridge lifter comprising impedances serially inserted in the loops of a multiloop network for isolating the loops from a common line, loop current measuring circuits, and switches responsive to the loop current measuring circuits for shunting the respective impedances when a respective loop becomes active. The impedances advantageously comprise resistors and the switches and loop current measuring circuits advantageously comprise transistor or semiconductor circuits which can be formed by hybrid integrated circuit techniques to provide a miniature bridge lifter. These miniature bridge lifters can be mounted in existing protectors which are mounted on the protector frame thereby eliminating the separate mounting frames and connecting jumpers which increase the installation costs of existing bridge lifters.

BRIEF DESCRIPTION OF THE DRAWING

The invention will be more fully comprehended from the following detailed description and accompanying drawing in which.

DETAILED DESCRIPTION

Figure 1:
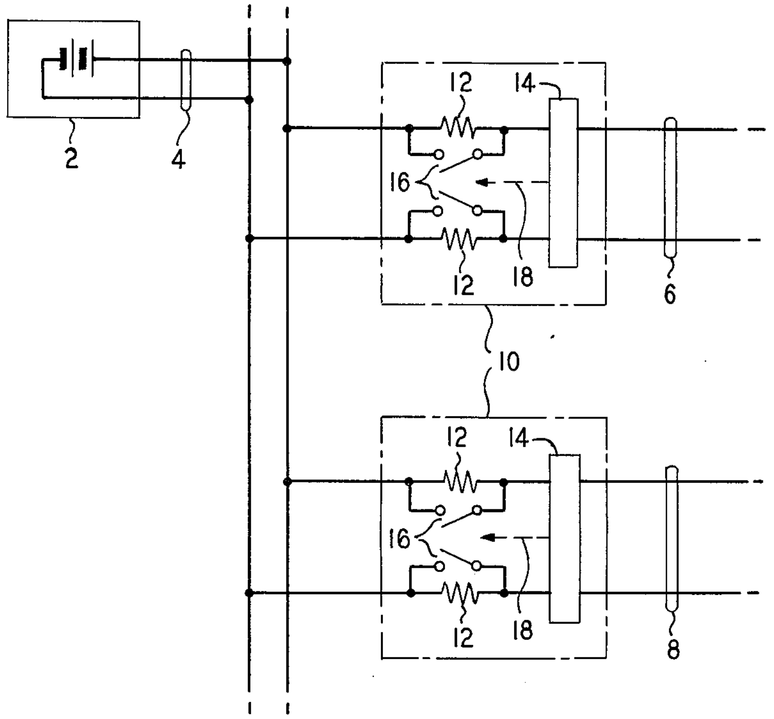
FIG. 1 is a schematic representation of a multiloop line utilizing bridge lifters in accordance with this invention.

FIG. 1 shows two loops 6 and 8, the terminations of which are located at some distance from each other and from their associated central office 2, which are connected or bridged to a common transmission medium or line 4. Although only two loops 6 and 8 are shown, it should be apparent that other loops could also be included. Each loop is connected to common line 4 by a bridge lifter 10. When a particular loop is idle, bridge lifter 10 effectively isolates the loop from common line 4 to keep it from loading line 4. When the loop becomes active, bridge lifter 10 connects the respective loop to common line 4 through a low impedance path.

Bridge lifters 10 each comprise impedances 12 in series with the respective loops and a loop current measuring circuit 14. Switches 16 are responsive to circuit 14 as indicated by arrow 18 for shunting or bypassing impedances 12. When a particular loop is idle, e.g., when the subscriber on a particular loop is on-hook, the only current flowing in the loop is leakage current. Loop current measuring circuit 14 has a threshold above the highest expected leakage current which determines when it activates the associated switches 16. Thus below this threshold the sum of impedances 12 plus any impedance associated with circuit 14 is presented to common line 4. Impedances 12 are of such a value that the total impedance presented to common line 4 is sufficient to effectively isolate the particular loop from common line 4 and the central office 2.

When the subscriber activates his loop, e.g., goes off-hook, the impedance in the loop is lowered thereby allowing sufficient loop current to flow to exceed the preselected threshold. Thereupon, loop current measuring circuit 14 closes switches 16 to shunt impedances 12 so that the particular subscriber loop is connected to common line 4 and central office 2 through a low impedance path.

Figure 2:
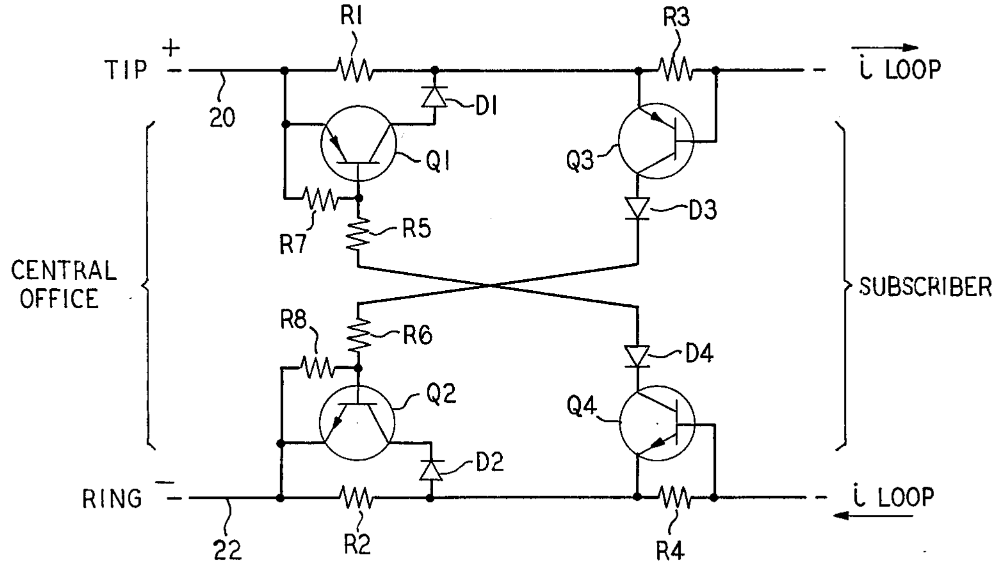
FIG. 2 is a schematic representation of a bridge lifter for use in the loops of FIG. 1.

FIG. 2 shows one simplified embodiment of bridge lifter 10 in greater detail. Isolating or loading resistors R1 and R2, respectively, and control resistors R3 and R4, respectively, are serially inserted in the tip and ring conductors of a subscriber loop. Resistors R1 and R2 and resistors R3 and R4, respectively, can have the same value but such is not required. Transistors Q1 and Q2 have their emitter-collector electrodes connected across resistors R1 and R2, respectively, with the collector electrodes connected to the respective terminals of the resistors through diodes D1 and D2, respectively, and the emitter terminals connected to the central office side of the respective resistors. Transistors Q3 and Q4 have their base-emitter electrodes connected across resistors R3 and R4, respectively, with the base electrodes connected to the subscriber side of the respective resistors. The collector electrodes of transistors Q3 and Q4 are connected to the base electrodes of transistors Q2 and Q1, respectively, via diode D3, resistor R6 and diode D4, resistor R5, respectively.

When the particular loop is idle, the only current flowing in tip 20 and ring 22, i.e., the only loop current, is a small leakage current. The values of resistors R3 and R4 are chosen so that the voltage produced across these resistors by this small leakage current is not sufficient to turn on transistors Q3 and Q4. Since transistors Q3 and Q4 provide the base drive current for transistors Q2 and Q1, respectively, these latter transistors are also off and the impedance in series with the particular loop is the sum of resistors R1, R2, R3 and R4. The values of resistors R1 and R2 can be chosen to provide the desired degree of isolation of the loop.

When the loop becomes active such as by the subscriber going off-hook, the resistance in the loop is decreased thereby allowing an increase in loop current. This increased current produces sufficient voltage drop across resistors R3 and R4 to turn on transistors Q3 and Q4, respectively. These transistors in turn activate transistors Q2 and Q1, respectively. By positive regeneration all transistors become saturated and thereby effectively shunt their associated resistors in the tip and ring conductors. When this occurs the total impedance inserted in series with the loop by the bridge lifter becomes the sum of the impedance of saturated transistors Q1 and Q2, the incremental impedance of diodes D1 and D2, and the incremental impedance of the base-emitter junctions of saturated transistors Q3 and Q4. All of these quantities are quite small so that their sum is also very small. Thus, the bridge lifter provides a low-loss path for connecting the loop to the common line.

Resistors R5 and R6 limit the leakage current between tip and ring when the transistors are saturated. To minimize the loading effect of this leakage current, resistors R5 and R6 should be as large as possible. On the other hand, these resistors R5 and R6 must be small enough to allow sufficient base drive current into transistors Q1 and Q2 to keep these transistors saturated when the loop is active. These conflicting requirements can be readily accommodated.

Resistors R7 and R8 which are connected between the base and emitter terminals of transistors Q1 and Q2, respectively, prevent the small leakage currents through these transistors from partially turning on the respective transistors when the particular loop is idle.

In addition to providing high isolation in the inactive state and a low-loss path in the active state, bridge lifters 10 must be insensitive to alternating current induced longitudinal currents. Diodes D1 and D2 prevent reverse currents from flowing in transistors Q1 and Q2, respectively. Such reverse currents might otherwise be generated by the reverse breakdown of the base-emitter junctions or the inverse gain of the respective transistors. For current to flow through transistor Q1 toward the subscriber in the tip conductor, transistor Q4 must also be activated. This requires current flow toward the central office and away from the subscriber in the ring conductor. Likewise, when current is flowing through transistor Q2 toward the central office in the ring conductor, transistor Q3 must be activated which requires that current be flowing toward the subscriber in the tip conductor. Thus only a loop current can activate the bridge lifter and it is insensitive to longitudinal currents up to the reverse breakdown of diodes D1 and D2 and the collector-emitter junction breakdown of transistors Q1 and Q2.

Figure 3:
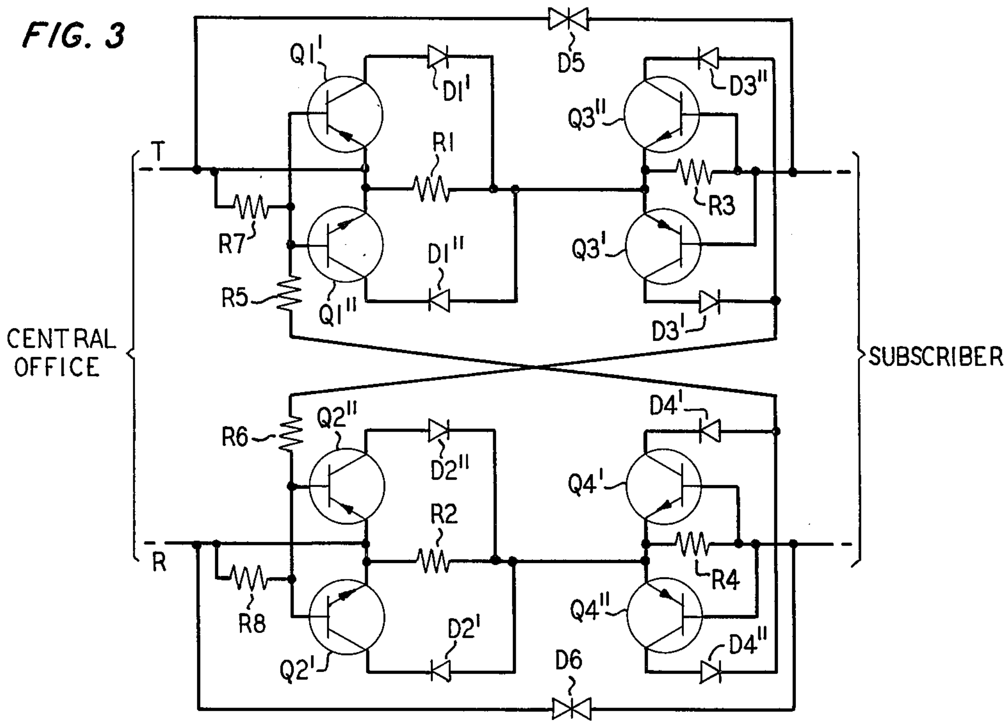
FIG. 3 is a schematic representation of a second embodiment of a bridge lifter which will work on either signal polarity.

In switching systems where the battery of the calling party is reversed when the called party answers his phone, the simple bridge lifter shown in FIG. 2 will not function. The bridge lifter is protected by diodes D1, D2, D3 and D4 during such battery reversal. However, by combining two of the FIG. 2 circuits input-to-input and output-to-output as shown in FIG. 3, a bridge lifter which operates with either battery polarity is obtained. In this combined circuit the same designations are used as in FIG. 2 except that a prime is added to the designations of elements of one circuit and a double prime is added to the designations of the elements of the second circuit. Several resistors in this combined circuit are essentially in parallel and can be combined into a single resistor. These resistors are shown by the same designations as shown in FIG. 2. The circuit of FIG. 3 which provides bridge lifting for either battery polarity must also withstand large current and voltage surges which can be impressed across the loop because of lightning strikes and power line crosses. Surge protection diodes D5 and D6, which can comprise back-to-back Zener diodes, placed across each arm or side of the bridge lifter provide such protection. The protection provided by diodes D5 and D6 is for the lifter itself and is not a replacement for the loop line protector.

Figure 4:
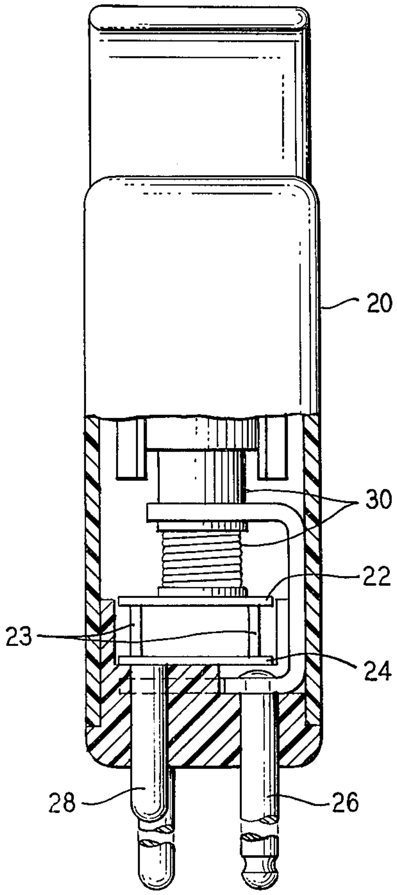
FIG. 4 is a partly sectional view of a bridge lifter mounted in a protector.

The bridge lifter shown in FIG. 3 can be readily formed by hybrid integrated circuit techniques. This provides a miniature bridge lifter which can be mounted in a slightly modified version of plug-in protectors presently used on the protector frames. FIG. 4 shows how the bridge lifter of FIG. 3, which is formed in two substrates can be mounted in such a modified protector 20. The two substrates 22 and 24 on which the bridge lifter is formed and required interconnections 23 therebetween are inserted into protector 20 and electrically connected between the subscriber line pin 26 and the central office pin 28. The only significant change in protector 20 is the provision of mounting space for substrates 22 and 24 and interconnections 23 and the electrical connection of circuits on these substrates into the path from the subscriber loop to the central office. Protector 20 still ultilizes the standard protection elements 30 in the normal manner. When the bridge lifters are mounted in the protector units as shown, there is no need for separate mounting frames and tie pairs as presently required.

While the invention has been described with reference to specific embodiments thereof, it is to be understood that various modifications can be made thereto by those skilled in the art without departing from its spirit and scope.

What is claimed is:

1. An electronic bridge lifter adapted for installation in transmission loops multiply connected to a common transmission line and responsive to levels of currents in said loops for isolating idle ones of said loop from said line and providing a low-loss connection to said line for active ones of said loops, CHARACTERIZED IN THAT said bridge lifter comprises:

first impedance means serially connected in a respective said loop for isolating said loop from said line;

semiconductor switch means for shunting said first impedance means with a low-loss path when said switch means is in a closed state, said switch means being in a normally open state; and loop current measuring means for measuring said level of current in said respective loop and activating said switch means to shunt said first impedance means when said level exceeds a preselected threshold and thereby connect said loop to said line through said low-loss path.

2. Apparatus in accordance with claim 1 wherein said first impedance means comprises a first resistor;

said switch means comprises a first transistor having base, emitter, and collector electrodes with said emitter and collector electrodes connected to respective terminals of said first resistor; and said measuring means comprises a second resistor serially connected in said loop, a second transistor having base, emitter and collector electrodes with said emitter and base electrodes connected to respective terminals of said second resistor and said collector electrode connected to said base electrode of said first transistor, said second resistor having a value sufficient to hold said level of current below said threshold when said loop is open and idle and allowing said level of current to exceed said threshold when said loop is closed and active.

3. Apparatus in accordance with claim 1 wherein said first impedance means includes first and second resistors serially connected in said loop;

said switch means comprises first and second transistors having respective base, emitter and collector electrodes with said emitter and collector electrodes of said first and second transistors connected to respective terminals of said first and second resistors, respectively; and said measuring means comprises third and fourth resistors serially connected in said loop, third and fourth transistors having base, emitter and collector electrodes with said emitter and base electrodes of said third and fourth transistors connected to respective terminals of said third and fourth resistors, respectively, and said collector electrodes of said third and fourth electrodes connected to said base electrodes of said second and first transistors, respectively, said third and fourth resistors have a total value sufficient to hold said level of said current below said threashold when said loop is open and idle and allowing said level of current to exceed said threshold when said loop is closed and active.

4. Apparatus in accordance with claim 3 including:

first and second diodes connected between said collector electrodes of said first and second transistors, respectively, and said respective terminals of said first and second resistors, respectively; and third and fourth diodes connected between said collector electrodes of said third and fourth transistors, respectively, and said base electrodes of said second and first transistors, respectively.

5. Apparatus in accordance with claim 4 including:

fifth and sixth resistors connected between said collector electrodes of said fourth and third transistors, respectively, and said base electrodes of said first and second transistors, respectively; and seventh and eighth resistors connected between said emitter and base electrodes of said first and second transistors, respectively.

6. Apparatus in accordance with claim 3 including:

fifth, sixth, seventh and eighth transistors having base, emitter, and collector electrodes and having polarities opposite to the polarities of said first, second, third and fourth transistors, respectively;

said fifth and sixth transistors having said emitter and collector electrodes connected with said respective terminals of said first resistor and second resistors, respectively, in parallel with said first and second transistors, respectively;

said seventh and eighth transistors having said emitter and base electrodes connected to respective terminals of said third and fourth resistors, respectively, in parallel with said third and fourth transistors, respectively;

said collector electrodes of said third and seventh transistors are connected to said base electrodes of said second and sixth transistors; and said collector electrodes of said fourth and eighth transistors are connected to said base electrodes of said first and fifth transistors, whereby said bridge lifter operates with either polarity of said current in said loop.

7. Apparatus in accordance with claim 6 including:

first, second, fifth and sixth diodes connected between said collector electrodes of said first, second, fifth, and sixth transistors, respectively, and said respective terminals of said first and second resistors, respectively; and third and fourth diodes and seventh and eighth diodes connected between said collector electrodes of said third and fourth transistors and said seventh and eighth transistors, respectively, and said base electrodes of said second and sixth transistors and said first and fifth transistors, respectively.

8. Apparatus in accordance with claim 7 including:

fifth and sixth resistors connected between said collector electrodes of said fourth and eighth transistors and said third and seventh transistors, respectively, and said base electrodes of said first and fifth transistors and said second and sixth transistors, respectively; and seventh and eighth resistors connected between said base and emitter electrodes of said first and fifth transistors and said second and sixth transistors, respectively.

9. Apparatus in accordance with claim 8 including:

a first bipolar diode means connected between said emitter electrodes of said first and fifth transistors and said base electrodes of said third and seventh transistors; and a second bipolar diode connected between said emitter electrodes of said second and sixth transistors and said base electrodes of said fourth and eighth transistors, whereby said bridge lifter is protected from current and voltage surges in said loop.

10. Apparatus in accordance with claim 9 wherein said first and second bipolar diode means comprise back-to-back Zener diodes.

11. In a communications system comprising a transmission line, a plurality of subscriber loops bridged across said line and terminated by a telephone set, bridge lifting apparatus in said loops that differentiates between levels of current in said loops to permit the transmission of signals to respective said sets when off-hook and to substantially block said signals when respective said sets are on-hook CHARACTERIZED IN THAT said bridge lifting apparatus comprises an electronic bridge lifter including:

first impedance means serially connected in a respective said loop for blocking said signals and isolating said loop from said line;

semiconductor switch means for shunting said first impedance means, said switch means being in a normally open state; and loop current measuring means for measuring said levels of current in said respective loops and activating said switch means to shunt said first impedance means when said level exceeds a preselected threshold thereby to allow said signals to reach said set.

* * * * *

UNITED STATES PATENT AND TRADEMARK OFFICE

CERTIFICATE OF CORRECTION

PATENT NO. : 3,881,068

DATED : April 29, 1975

INVENTOR(S) : Charles E. Jones, Jr. and William F. MacPherson

It is certified that error appears in the above-identified patent and that said Letters Patent are hereby corrected as shown below:

Column 5, claim 3, line 40, "electrodes" should be --transistors--. Column 6, claim 7, line 27, "fourth" should be --seventh-- and "seventh" should be --fourth--; line 29, "fourth" should be --seventh-- and "seventh" should be --fourth--.

Signed and Sealed this

Ninth Day of November 1976

[SEAL]

*Attest:*

RUTH C. MASON
*Attesting Officer*

C. MARSHALL DANN
*Commissioner of Patents and Trademarks*